(12) United States Patent
Wagner

(10) Patent No.: US 11,300,475 B2
(45) Date of Patent: Apr. 12, 2022

(54) TANK TESTING APPARATUS AND METHOD

(71) Applicant: Leighton O'Brien Technology Pty Limited, Hawthorn (AU)

(72) Inventor: Peter Wagner, Hawthorn East (AU)

(73) Assignee: Leighton O'Brien Technology Pty Limited, Hawthorn (AU)

(\*) Notice: Subject to any disclaimer, the term of this patent is extended or adjusted under 35 U.S.C. 154(b) by 1 day.

(21) Appl. No.: 16/331,516

(22) PCT Filed: Sep. 13, 2017

(86) PCT No.: PCT/AU2017/000195
§ 371 (c)(1),
(2) Date: Mar. 7, 2019

(87) PCT Pub. No.: WO2018/049463
PCT Pub. Date: Mar. 22, 2018

(65) Prior Publication Data
US 2019/0204178 A1 Jul. 4, 2019

(30) Foreign Application Priority Data

Sep. 13, 2016 (AU) ............................... 2016903681

(51) Int. Cl.
*G01M 3/32* (2006.01)
(52) U.S. Cl.
CPC ........ *G01M 3/3263* (2013.01); *G01M 3/3272* (2013.01)
(58) Field of Classification Search
CPC ............................ G01M 3/3263; G01M 3/3272

USPC .......................................................... 73/49.2
See application file for complete search history.

(56) References Cited

U.S. PATENT DOCUMENTS

| 4,885,931 A | 12/1989 | Horner |
| 6,148,854 A | 11/2000 | Major et al. |
| 7,143,634 B1 | 12/2006 | Major et al. |

*Primary Examiner* — John Fitzgerald
*Assistant Examiner* — Rodney T Frank
(74) *Attorney, Agent, or Firm* — Wiggin & Dana LLP; Gregory S. Rosenblatt; Rikesh P. Patel

(57) ABSTRACT

There is described a testing apparatus (20) for testing the integrity of a tank (12). The apparatus comprises a control tube (22) configured to be at least partially submerged within the tank (12). The control tube (22) being controlled to open and close to permit the ingress and capture of fuel into the control tube (22) from the tank (12). A first gas tube (29) is connectable to a remote gas source (40) and is configured to deliver gas to an outer surface of the control tube (22) at a predetermined location. A second gas tube (29) is connectable to the remote gas source (40) and configured to deliver gas to an inner surface of the control tube (22) at a predetermined location. A metering unit (30) is in fluid communication with the first gas tube (29) and the second gas tube (29) and having one or more pressure sensors (32) for measuring fuel mass inside the control tube (22) and fuel mass outside the control tube (22) and for comparing the two measurements to determine a change in fuel mass outside the control tube (22). The change in fuel mass outside the control tube (22) being indicative of a loss of integrity of the tank (12).

17 Claims, 5 Drawing Sheets

TANK TESTING APPARATUS AND METHOD

RELATED APPLICATION(S)

The present application claims priority from Australian Provisional Patent Application No. 2016903681, filed on 13 Sep. 2016, the entire contents of which are incorporated herein by reference.

FIELD OF INVENTION

The present invention relates generally to an apparatus and method for testing the integrity of fuel storage tanks, and in particular, to an apparatus and method for testing fuel storage tanks for the presence of leaks by using mass measurements of the fuel contained therein in relation to a controlled environment

BACKGROUND OF THE INVENTION

Fuel, such as petrol, diesel and the like, remains an important energy source for engines, especially internal combustion engines and the like, used to power automobiles, aircraft and watercraft. In this regard, fuel dispensing outlets exist in a variety of forms to provide a means for dispensing fuel to such engines for operation. Such dispensing outlets may include service stations for use by the general public to purchase fuel which is directly deposited into a fuel tank for use in their automobiles and other engines, as well as large fuelling stations for servicing fleets or vehicles or aircraft, such as airports and the like.

Irrespective of the type of fuel dispensing outlet, in order to store a large volume of fuel for dispensing, fuel storage tanks are typically provided. Such storage tanks may be provided above-ground, semi-buried in the ground or wholly buried underground. In order to enhance the safety of the storage tanks, there exist a variety of laws and regulations set by various authorities that dictate the manner in which such storage tanks are to be configured and the type of equipment that is to be used with such storage tanks to meet environmental and public health and safety concerns.

One such requirement for use with underground fuel storage tanks is the need to detect leakage of fuel from the tank in a quick and efficient manner, such that appropriate action can be readily taken to rectify the cause of such a potentially hazardous event. For this reason, a variety of different probes and sensors have been developed to assist in detecting the presence of leakages in tanks, using a variety of different methods.

Often, even after the detection of a leak in a tank has resulted in the tank being replaced or restored, it is difficult to accurately perform a check that simply proves that the leak has been corrected. Most existing leak detection systems are either too flawed or not accurate enough to provide reliable measurements. In many instances, existing detection devices can only be used when the storage tank is empty, such as "vacuum box testing" systems. Other systems rely upon level sensors and in many leakage situations, large volume changes may only produce small fluid level changes, making it difficult to obtain reliable measurements.

Mass measurement systems have been proposed but generally lack the precision required for leak detection applications, especially in larger tanks which may vary in shell shape and construction.

Thus, there is a need to provide an improved apparatus and method for detecting the presence of leaks in tanks which overcomes, or at least ameliorates, at least some of the deficiencies of the prior art The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a testing apparatus for testing the integrity of a tank comprising:

- a control tube configured to be at least partially submerged within the tank, the control tube being controlled to open and close to permit the ingress and capture of fuel into the control tube from the tank;
- a first gas tube connectable to a remote gas source and configured to deliver gas to an outer surface of the distal end of the control tube at a predetermined location;
- a second gas tube configured to the remote gas source and configured to deliver gas to an inner surface of the distal end of the control tube at a predetermined location; and
- a metering unit in fluid communication with the first gas tube and the second gas tube and having one or more pressure sensors for measuring fuel mass inside the control tube and fuel mass outside the control tube and for comparing the two measurements to determine a change in fuel mass outside the control tube, the change in fuel mass outside the control tube being indicative of a loss of integrity of the tank.

In one embodiment, the control tube comprises having a distal end that is controlled to open and close to permit the ingress and capture of fuel therein. The control tube may comprise a cylindrical body of material inserted through an opening in said tank such that a distal end of said cylindrical body is in contact with a bottom of said tank and an opening of said cylindrical body extends out the opening of the tank.

The distal end of the cylindrical body may have a probe portion mounted thereto. The probe portion may be configured to abut the bottom of the tank and has a controlled fluid ingress member mounted therein to facilitate the ingress of fluid from the tank into the cylindrical body.

In one embodiment, the controlled fluid ingress member is a Shrader valve remotely actuable to open and close to permit the ingress and capture of fuel into the control tube from the tank. The Shrader valve may be remotely actuable by way of a valve rod attached to the Shrader valve at a distal end and extending within the cylindrical body to be actuated through the application of a weight to a proximal end thereof so as to open the Shrader valve to permit the ingress of fluid into the cylindrical body. The Shrader valve may be biased into a closed position such that upon removal of said weight from the proximal end of the valve rod, the Shrader valve returns to its biased closed position.

In another embodiment, the controlled fluid ingress member may be a pressure release valve remotely actuable to open and close to permit the ingress and capture of fuel into the control tube from the tank. The pressure release valve may be remotely actuable by way of a cable attached at a distal end to the pressure release valve and which extends within the cylindrical body such that a proximal end thereof extends from the opening of the cylindrical body. The pressure release valve may be biased to a closed position and upon application of a force to the proximal end of the cable the pressure release valve is movable into an open position to permit the ingress and capture of fuel into the control tube from the tank.

Both the first gas tube and the second gas tube may be connected to the same gas source that supplies gas at a predetermined pressure. The gas source may be a nitrogen gas source. The predetermined location for delivering gas from the first gas tube may be at a distance from the opening of the control tube substantially identical to the distance from the opening of the control tube of the predetermined location for delivering gas from the second gas tube.

Accordingly, in another aspect of the invention there is provided a method of testing the integrity of a tank comprising:
 creating an enclosed environment representative of the interior of the tank within the interior of the tank;
 delivering a controlled supply of gas to the tank and to the enclosed environment by way of a pair of jet tubes, one of the jet tubes located within the enclosed environment and the other outside the enclosed environment;
 measuring a pressure at each of the jet tubes;
 comparing the pressure measured at the jet tube outside the enclosed environment with the pressure measured at the jet tube inside the controlled environment such that any changes in the pressure measured at the jet outside the enclosed environment is representative of the tank lacking integrity.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The present invention will be described below in relation to its application for use in detecting the presence of a leakage in an underground fuel storage tank. However, it will be appreciated that the present invention could equally be applied for use in detecting the presence of a leakage in any storage vessel present above-ground or partially buried in the ground, as will be appreciated by those skilled in the art.

Figure 1:
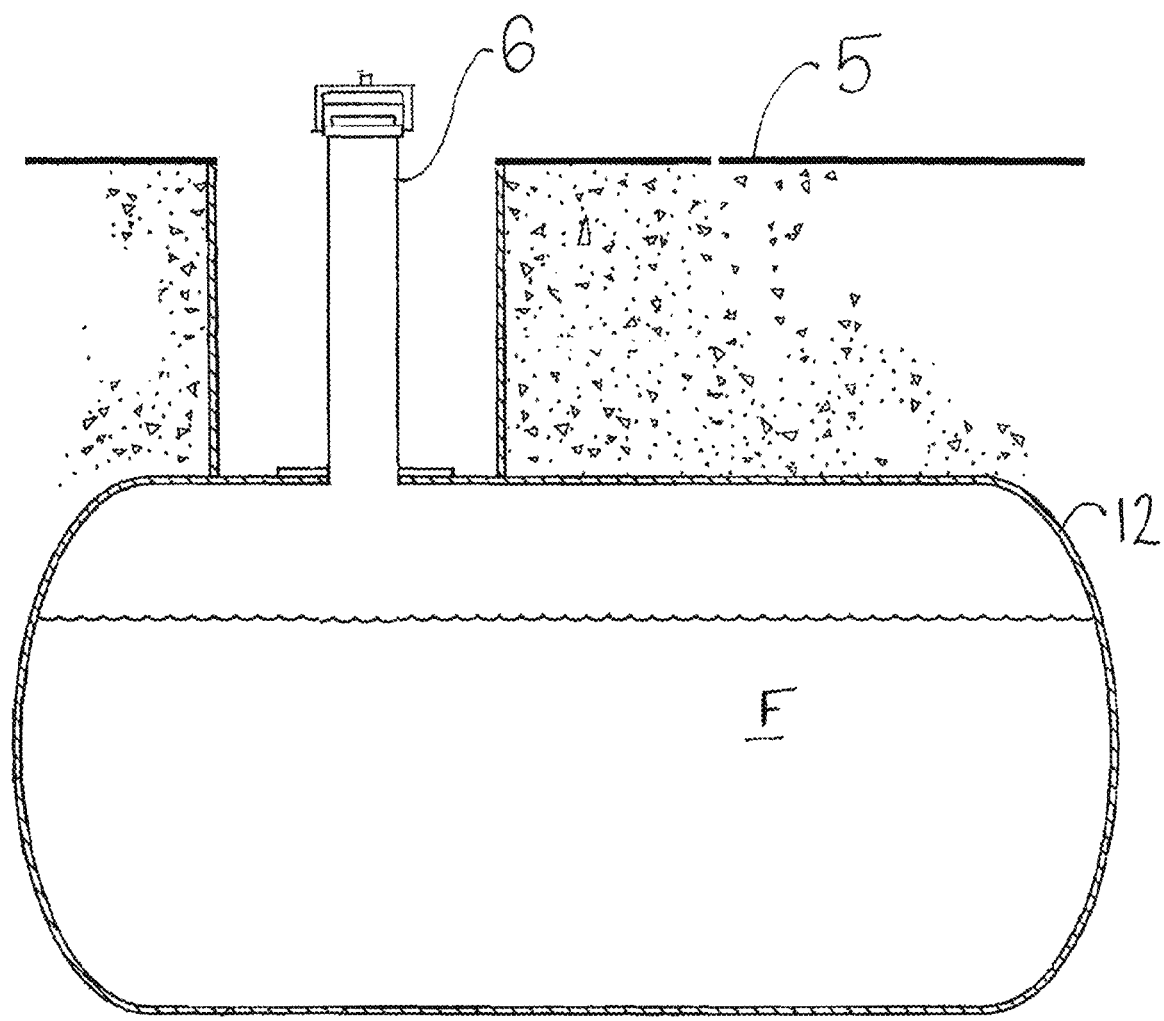
FIG. 1 shows an underground tank suitable for testing with the present apparatus.

Referring to FIG. 1, an underground storage tank 12 is depicted, which is located below a ground surface 5 and is accessible by way of a riser outlet 6. The storage tank 12 is configured to store a volume of fuel (F) for dispensing by way of a dispenser unit (not shown) in fluid communication with the fuel (F). During use, it may be possible that the integrity of the tank 12 may become compromised resulting in leakages of fuel therefrom, which is highly undesirable. Initially, leakage of fuel may occur at a very slow rate which is difficult to readily detect due to the large volume of the fuel present in the tank 12 and the fact that a change in volume of the fuel may have very little effect on the change in level of the fuel.

Figure 2:
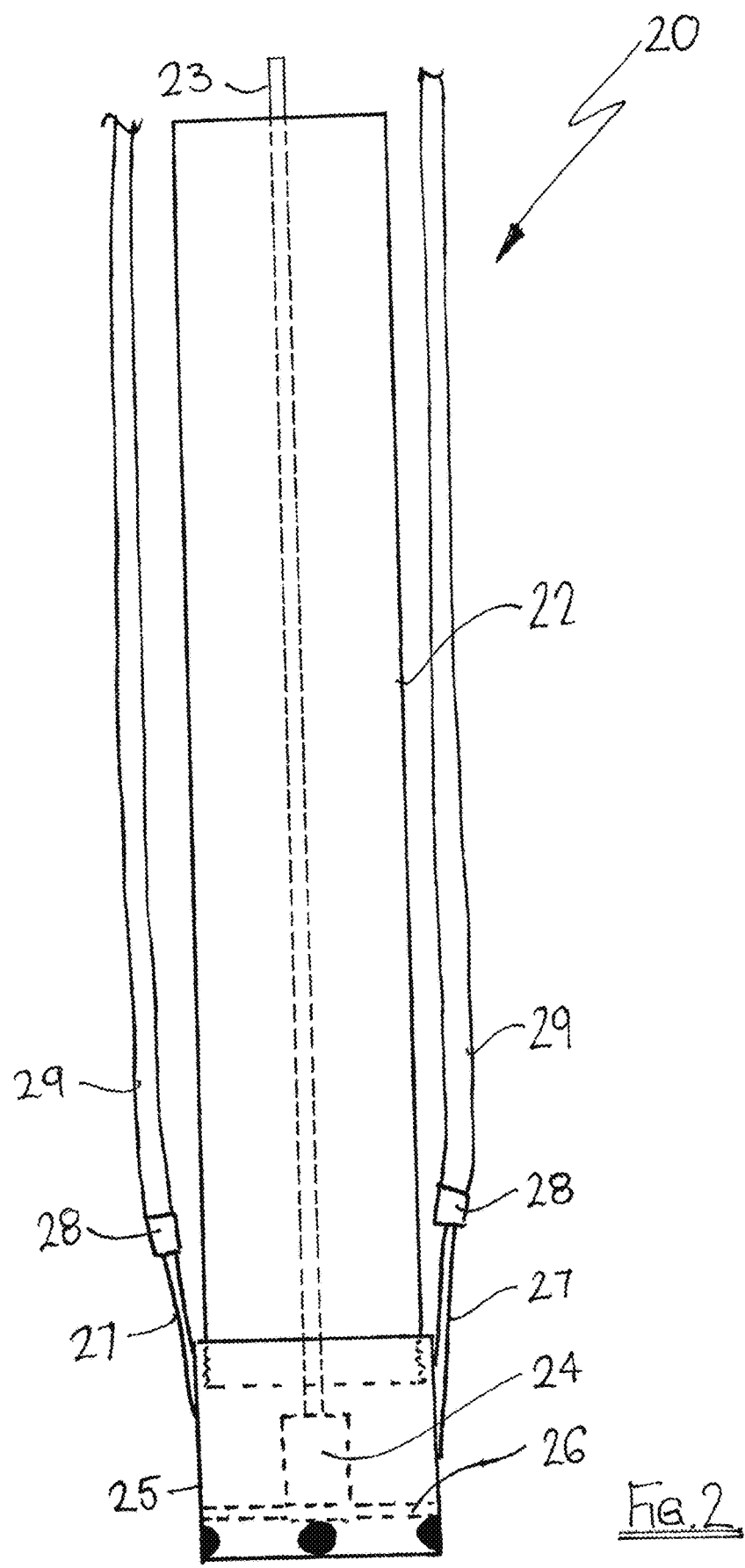
FIG. 2 depicts the apparatus of the present invention in accordance with an embodiment.

In order to detect such a leakage in tank 12, the apparatus 20 as depicted in FIG. 2 is used. The apparatus 20 is configured to be inserted into the tank 12 through the riser outlet 6 such that it is substantially submerged into the fuel F, as will be discussed in more detail below.

The apparatus 20 generally comprises a control tube 22 and may be made from carbon fibre, PVC, aluminium or any other similar material suitable for use in such an environment. The control tube 22 has a diameter of around 25 mm and may have a length of approximately 2000 mm. However, other dimensions are also envisaged depending upon the type of the tank 12 being tested and the dimensions of that tank.

The control tube 22 is fitted at a distal end thereof with a controlled fluid ingress member 24 that is controllable to permit the entry of fluid, typically fuel present in the tank 12, into the control tube 22.

In one embodiment, the controlled fluid ingress member 24 comprises a Schrader valve mounted at the distal end of the control tube 22, as shown in FIG. 2. The Schrader valve may be fitted within a seal to ensure that the fluid can only flow into the control member 22 via the Schrader valve. A valve rod 23, in the form of a thin rod extending within the control tube 22 is provided to control the opening/closing of the Schrader valve from above ground. A weight (approximately 2 Kg) is provided on the end of the valve rod to provide a force to push the plunger of the Schrader valve to an open position to open the ingress member 24. To close the Schrader valve, the weight is removed from the valve rod 23 which causes the plunger of the Schrader valve to close under a biased spring action.

In an alternative embodiment, the controlled fluid ingress member 24 may be in the form of a pressure safety/release valve (PSV/PRV). A cable may extend within the length of the control tube 22 so as to be connected at a distal end to the PSV/PRV. The PRV/PSV may be opened by applying a force to the cable so as to open the valve to enable fuel to enter the control tube 22. By releasing the force on the cable, the PRV/PSV will return to its biased closed position.

Figure 3:
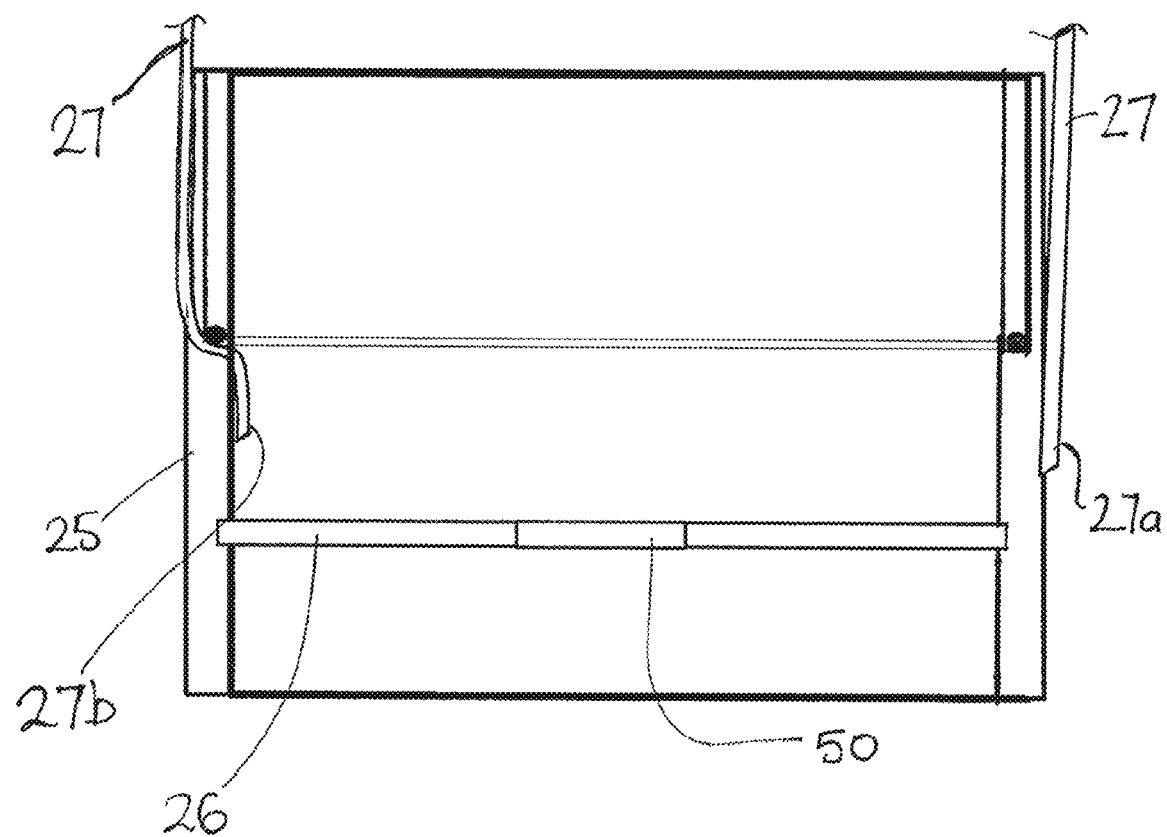
FIG. 3 depicts a probe portion of the apparatus of FIG. 2 in isolation.

As is shown more clearly in FIG. 3, the distal end of the control tube 22 has a probe portion 25 mounted thereto. In one embodiment, the probe portion 25 is screwingly engaged to the distal end of the control tube 22. The probe portion 25 may be made from a similar material to the control tube 22 or may be made from a metal, such as steel, which has an open end with a base plate 26 extending thereacross with a central hole or recess 50 formed therein. The controlled fluid ingress member 24 is mounted on the base plate within the central recess such that when the controlled fluid ingress member 24 is opened, fuel is able to enter into the control tube 22 through the controlled fluid ingress member 24.

Referring to FIG. 2, a pair of jet tubes 27 are mounted to the external surface of the probe portion 25 as shown. The jet tubes 27 are preferably formed from copper tubing having an outer diameter of 3 mm and an inner diameter of 2 mm. The jet tubes 27 may be secured to the external surface of the probe portion 25 by brazing or glue and may have connector members 28 attached thereto to facilitate connection of each of the jet tubes 27 with a corresponding flexible tubing 29. The connector members 28 are essentially collars which form a sealed engagement with the flexible tubing 29. The flexible tubing 29 extends along the external surface of the control tube to be connected to a gas source located externally of the tank 12, as will be described in more detail below.

FIG. 3 depicts the probe portion in isolation. In this depiction, the ends of the jet tubes 27 are shown in more detail. End 27a depicts an end of an outer jet tube 27 as it terminates adjacent the outer surface of the probe portion 25. The other jet tube 27 passes through a hole in the wall of the probe portion 25 such that the end 27b is located adjacent an inner wall of the probe portion 25 at substantially the same height above the base plate 26 as the end 27a.

Figure 4:
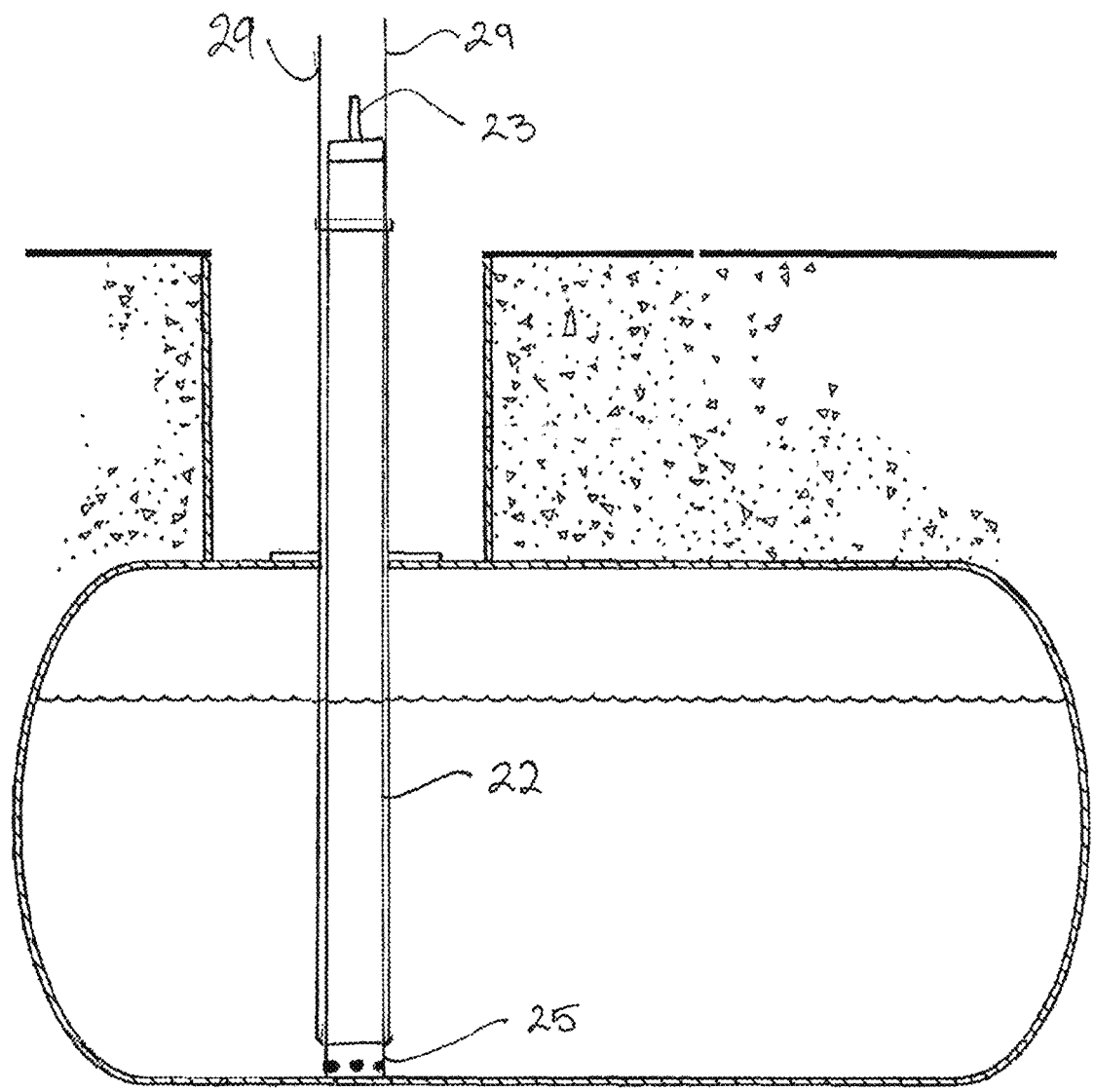
FIG. 4 depicts the apparatus of FIG. 2 in a first stage of use.

In order to use the apparatus 20 of the present invention, the apparatus is lowered into the tank in the manner as shown in FIG. 4, until the end of the probe portion 25 contacts the bottom of the tank 12. At this point the valve rod 23 is activated to open the controlled fluid ingress member 24 valve such that fuel can enter the control tube 22. The controlled fluid ingress member remains open until the level of fuel inside the control tube 22 has equalised with the level of fuel in the tank 12, outside of the control tube 22. Upon equalisation of these levels, the controlled fluid ingress member 24 is closed, as is shown in FIG. 5.

Figure 5:
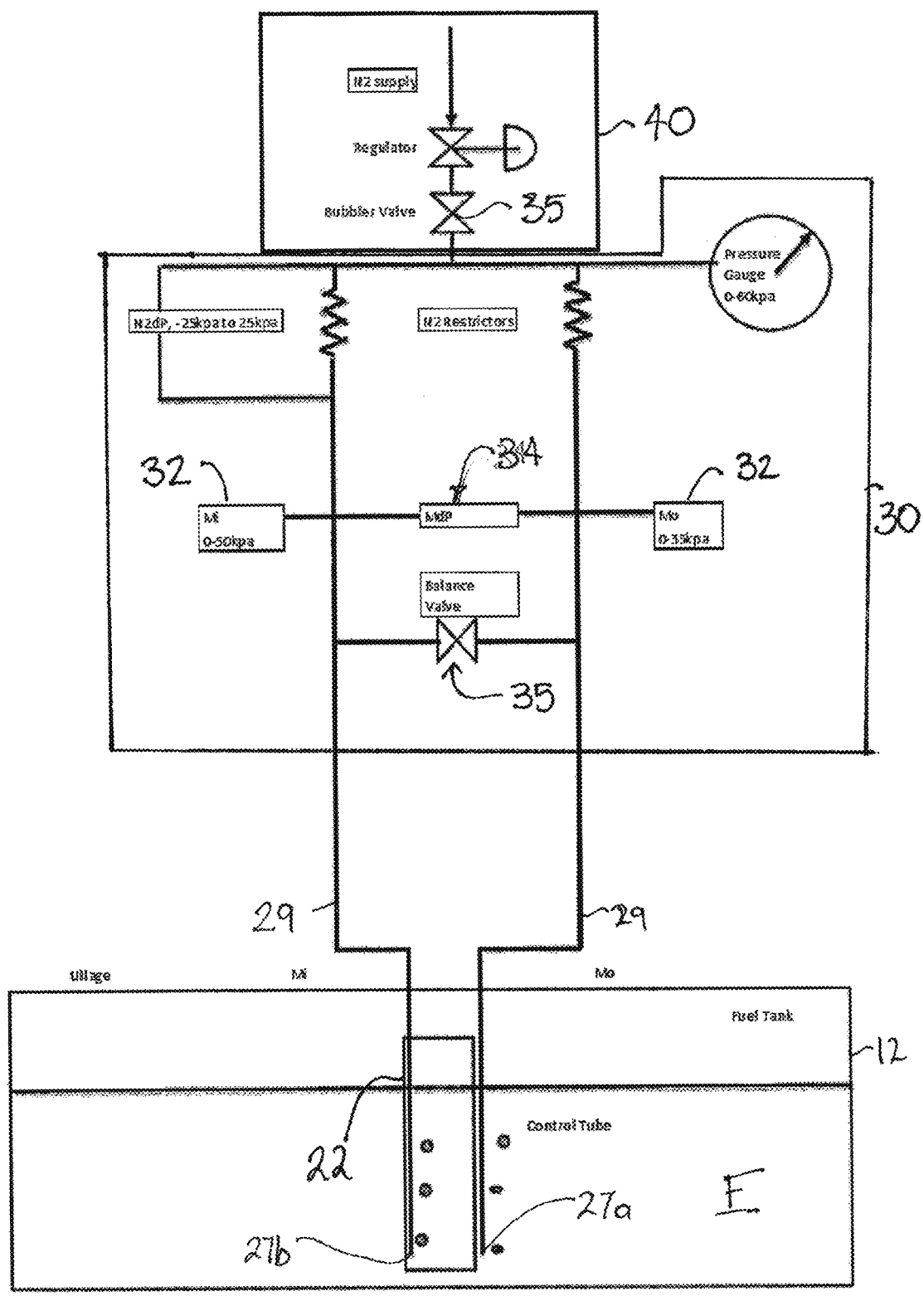
FIG. 5 depicts the apparatus of FIG. 2 in a second stage of use for measuring the mass of fuel present in the tank.

As is shown in FIG. 5, each of the ends of the flexible tubing 29 that are connected to the inner jet tube 27b and the outer jet tube 27a respectively are connected to a metering device 30 which is, in turn, connected to a gas source 40, namely a Nitrogen gas source. The metering device 30 comprises a pair of mass sensors 32 (Mo (0-35 kPa) and Mi (0-50 kPa)) and a differential pressure sensor (MdP) 34 (sensitive low pressure sensor (250 Pa-1000 Pa)) and each of these are in connection with the inner jet tube 27b and the outer jet tube 27a. The differential pressure sensor 34 is able to provide a means for determining drift of the measurements and the mass sensors 32 assist in providing a means for detecting where the N2/fuel interface is in the control tube and tank respectively. Ball valves 35 are provided to equalise each side of the apparatus and a Nitrogen gas supply 40 provides the supply of gas to generate mass pressure.

To undertake a test using the apparatus 20, the apparatus is firstly set up as described above, with the control tube 22 lowered into the tank 12. The weight is applied to the top of the valve rod 23 to open the ingress member 24 to allow fuel to fill the control tube 22 to the static level. Each of the ends Mo and Mi of the flexible tubing 29 are connected to the Nitrogen supply and the metering device is able to monitor the activity of mass sensors Mo and Mi on a graph. The Nitrogen supply is then set by the regulator to be supplied at 5 kPa above the theoretical mass reading for the system. The mass graphs for Mo and Mi are then monitored to ensure that they are both rising towards the theoretical mass reading at which point the Mo and Mi graphs should flat line and bubbling will commence. The valve weight is then removed from the valve rod such that the controlled fluid ingress member 24 is closed and the control tube 22 is sealed. The balance valve provided on the metering device is also closed.

The inner jet tube 27b and the outer jet tube 27a to release bubbles along the inside of the control tube 22 and along the outside of the control tube 22 respectively. The bubbles continue to be delivered from the jet tubes 27a and 27b at a rate of every 2-5 seconds to enable the mass sensors 32 to make a determination of the mass inside the control tube 22 (Mi) and mass outside the control tube 22 (Mo). The time for the test may be around 1 hour and over this time continuous mass readings will be taken by the mass sensors Mo and Mi and recorded over time.

A difference in pressure MdP is measured between the inner jet tube 27b and the outer jet tube 27a using the differential pressure sensor 34. As the control tube 22 is sealed, the Mi reading should remain stable with the Mo being determined as the mass of fuel in the tank. Any small changes in the mass of fuel in the tank, as may occur as a result of a leak, are then able to be detected through a continual comparison of Mo with respect to Mi. The Mo readings can be monitored on their own and through a knowledge of the dimensions of the system being tested, such as fuel height, tank floor depth, dip riser height, tank water level, it is possible to calculate whether the mass of fuel present in the tank is increasing or decreasing, relative to the mass of fuel present in the control tube 22. This then provides a precise and accurate portrayal of the structural integrity of the tank and whether there are any leaks present It will be appreciated that by establishing a system whereby a controlled volume of fuel is maintained within the tank for obtaining fuel mass measurements of such an enclosed area for comparison against a non-controlled region of the tank, small variations in fuel mass can be determined to assess the integrity of the tank to a much greater accuracy. In this regard, the apparatus and method of operation of the present invention provides a simple and accurate means for determining changes in fuel mass within a tank, even in the event of very small changes occurring through a small or slow leak. This is achieved by comparing a controlled tube of fuel with the remainder of the tank and identifying any variations therebetween.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the apparatus uppermost.

It will be appreciated by those skilled in the art that many modifications and variations may be made to the methods of the invention described herein without departing from the spirit and scope of the invention.

The claims defining the invention are as follows:
1. A testing apparatus for testing the integrity of a tank comprising:
   a control tube configured to be at least partially submerged within fuel held in the tank, the control tube being controlled to open and close to permit the ingress and capture of fuel into the control tube from the tank such that the level of fuel captured within the control tube is equal to the level of fuel held in the tank;

a first gas tube connectable to a remote gas source and configured to deliver gas to an outer surface of the control tube at a predetermined location;

a second gas tube connectable to the remote gas source and configured to deliver gas to an inner surface of the control tube at a predetermined location; and a metering unit in fluid communication with the first gas tube and the second gas tube and having one or more pressure sensors for measuring fuel mass inside the control tube and fuel mass outside the control tube and for comparing the two measurements to determine a change in fuel mass outside the control tube, the change in fuel mass outside the control tube being indicative of a loss of integrity of the tank.

2. A testing apparatus according to claim 1, wherein the control tube comprises a distal end that is controlled to open and close to permit the ingress and capture of fuel into the control tube from the tank.

3. A testing apparatus according to claim 2, wherein the control tube comprises a cylindrical body of material inserted through an opening in said tank such that a distal end of said cylindrical body is in contact with a bottom of said tank and an opening of said cylindrical body extends out of the opening of the tank.

4. A testing apparatus according to claim 2, wherein the distal end of the cylindrical body has a probe portion mounted thereto.

5. A testing apparatus according to claim 3, wherein the probe portion is configured to abut the bottom of the tank and has a controlled fluid ingress member mounted therein to facilitate the ingress of fluid from the tank into the cylindrical body.

6. A testing apparatus according to claim 4, wherein the controlled fluid ingress member is a Shrader valve remotely actuable to open and close to permit the ingress and capture of fuel into the control tube from the tank.

7. A testing apparatus according to claim 5, wherein the Shrader valve is remotely actuable by way of a valve rod attached to the Shrader valve at a distal end and extending within the cylindrical body to be actuated through the application of a weight to a proximal end thereof so as to open the Shrader valve to permit the ingress of fluid into the cylindrical body.

8. A testing apparatus according to claim 6, wherein the Shrader valve is biased into a closed position such that upon removal of said weight from the proximal end of the valve rod, the Shrader valve returns to its biased closed position.

9. A testing apparatus according to claim 4, wherein the controlled fluid ingress member is a pressure release valve remotely actuable to open and close to permit the ingress and capture of fuel into the control tube from the tank.

10. A testing apparatus according to claim 8, wherein the pressure release valve is remotely actuable by way of a cable attached at a distal end to the pressure release valve and which extends within the cylindrical body such that a proximal end thereof extends from the opening of the cylindrical body.

11. A testing apparatus according to claim 9, wherein the pressure release valve is biased to a closed position and upon application of a force to the proximal end of the cable the pressure release valve is movable into an open position to permit the ingress and capture of fuel into the control tube from the tank.

12. A testing apparatus according to claim 1, wherein both the first gas tube and the second gas tube are connected to the same gas source that supplies gas at a predetermined pressure.

13. A testing apparatus according to claim 11, wherein the gas source is a nitrogen gas source.

14. A testing apparatus according to claim 11, wherein the predetermined location for delivering gas from the first gas tube is at a distance from the opening of the control tube substantially identical to the distance from the opening of the control tube of the predetermined location for delivering gas from the second gas tube.

15. A testing apparatus according to claim 14, wherein the metering unit comprises a pair of mass pressure sensors for measuring fuel mass inside the control tube and fuel mass outside the control tube and for plotting the measurements taken over time.

16. A testing apparatus according to claim 14, wherein the metering unit comprises a differential mass pressure sensor for determining a difference in mass pressure measurements taken from inside and outside the control tube.

17. A method of testing the integrity of the tank of claim 1, comprising the steps of:

creating an enclosed environment representative of the interior of the tank within fuel held in the tank;

delivering a controlled supply of gas to the tank and to the enclosed environment by way of a pair of tubes, one of the tubes being located within the enclosed environment and the other outside the enclosed environment;

measuring a pressure at each of the tubes;

comparing the pressure measured at the tube outside the enclosed environment with the pressure measured at the tube inside the controlled environment such that any changes in the pressure measured at the tube outside the enclosed environment is representative of the tank lacking integrity.

* * * * *